April 30, 1968 P. W. JENSEN ET AL 3,381,083

MAGNETIC RECORDER EQUALIZATION SYSTEM HAVING CONTINUALLY ADJUSTED COMPENSATION

Filed March 12, 1965 2 Sheets-Sheet 1

CHARLES COLEMAN,
PETER W. JENSEN and
ALLEN TROST
INVENTORS

BY Robert S. Clay

ATTORNEY

April 30, 1968 P. W. JENSEN ET AL 3,381,083

MAGNETIC RECORDER EQUALIZATION SYSTEM HAVING CONTINUALLY ADJUSTED COMPENSATION

Filed March 12, 1965 2 Sheets-Sheet 2

CHORLES COLEMAN, PETER W. JENSEN and ALLEN TROST
INVENTORS

BY Robert S. Clay

ATTORNEY

Patented Apr. 30, 1968

3,381,083

MAGNETIC RECORDER EQUALIZATION SYSTEM HAVING CONTINUALLY ADJUSTED COMPENSATION

Peter W. Jensen, Fremont, Charles H. Coleman, Belmont, and Allen J. Trost, Santa Clara, Calif., assignors to Ampex Corporation, Redwood City, Calif., a corporation of California
Filed Mar. 12, 1965, Ser. No. 439,307
10 Claims. (Cl. 178—5.2)

This invention relates to a recorder system and in particular to a recorder system for recording color television signals and having a means for automatically and continually equalizing the response of the playback transducers.

It is well known in the prior art that recorder systems, which include playback electronics for the reproduction of recorded information, require equalizer means to compensate for the response of the playback transducers. One well known recorder system for recording television signals includes a rotary drum with a plurality of transducers mounted thereon and positioned in transverse and intimate relationship with respect to a longitudinally moving magnetic tape. The transducers in such a system are each connected to the playback electronics that incorporates an equalizer means for each of the transducers. (There may be other equalizers included in the playback electronics that are common to more than one transducer.) According to prior art techniques, each of these equalizers are initially adjusted by an operator to provide a satisfactory picture. This adjustment is performed by manipulating some sort of manual means and viewing the monitor. Such an adjusting technique is necessarily subjective and what appears satisfactory to one operator could be unacceptable to another operator. Thus, the prior art technique is at best a rough approximate adjustment of the equalizers. This adjustment is not particularly objectionable in the case of a monochrome recorder system (one that records black and white television signals), but in the case of a recorder for color television signals it has been found that the operators are sensitive to slight color variations or differences and the sensitivity and taste of each operator may be different in this respect. The adjustment that one operator may select as satisfactory could prove to be objectionable to viewers and other operators. In addition to the subjective standard of adjustment and sensitivity of the viewer to color information, the chroma level changes from moment to moment due to errors in the record/reproduce process. All this results in many adjustments and the displeasure of some viewers.

In addition to these problems, it is not uncommon for record conditions to vary during the production of a tape. This variance of record conditions may require that different equalization adjustments be employed during playback. To do this manually is a time consuming and impractical procedure. Besides the record conditions changing it is common practice to record a program and subsequently dub in commercials. Such a procedure frequently results in the need for different equalization on the various parts of a recording, that is the program and the commercials. A manual equalizer adjustment does not facilitate such adjustment.

The above mentioned disadvantages of prior art equalizing systems are accentuated in color television recorders where the composite video signal contains a relatively large amount of high frequency signal information representative of hue and saturation information. This information is commonly transmitted as a suppressed carrier modulated signal with the subcarrier at about 3.58 megacycles and recorded by frequency modulation techniques. In a color television signal there is a large content of high frequency signals and these signals are representative of color information which makes their equalization a critical consideration. Thus, it is more important in a color television signal recorder system that the large amplitude high frequency signals be precisely and continuously equalized. The frequency of the recorded signal will in part depend on the value of the carrier employed in the frequency modulation system.

This invention overcomes the prior art shortcomings and provides a recorder system having means for continually and automatically equalizing the response of the playback transducers in accordance with a fixed objective standard. The invention utilizes a fixed frequency signal recorded on the medium and separated from the other recorded signals during playback. The separated signal is supplied to a comparator which compares it with a reference signal. Any difference between the reference signal and the reproduced signal results in an error signal that is applied to the equalizer means for correcting its adjustment.

From the detailed specification which follows it will be apparent that this broad concept has particular advantages and compatibility with color television recording systems. In such systems the burst signal on the back porch of the sync pulse is especially well suited to function as an indicator of the need for equalization adjustment, that is an equalization correction signal. The burst signal has a precisely controlled frequency of about 3.58 megacycles so that it forms an excellent reference signal. Most of the recorded color information is in the proximity of the 3.58 megacycle subcarrier so that equalizing based on this frequency is particularly effective to afford excellent reproduction of the color information which is the most critical aspect of the color television signal. Thus, the invented system is particularly advantageous in color television recording systems.

Briefly, the structure of the invention comprises an equalizer correction signal recorded on the recording medium, a transducer means for transducing information signals and the correction signal from the recording medium, equalizer means for compensating for the normal response of the transducer means over at least a part of the frequency range of signals transduced, and equalizer correction means for receiving the correction signal from the transducer and for applying a correction signal to the equalizer means to continually and automatically adjust the compensation provided by the equalizer means.

The above generally described structure and advantages may be more completely understood by reference to the specification and the drawings, wherein.

Figure 1:
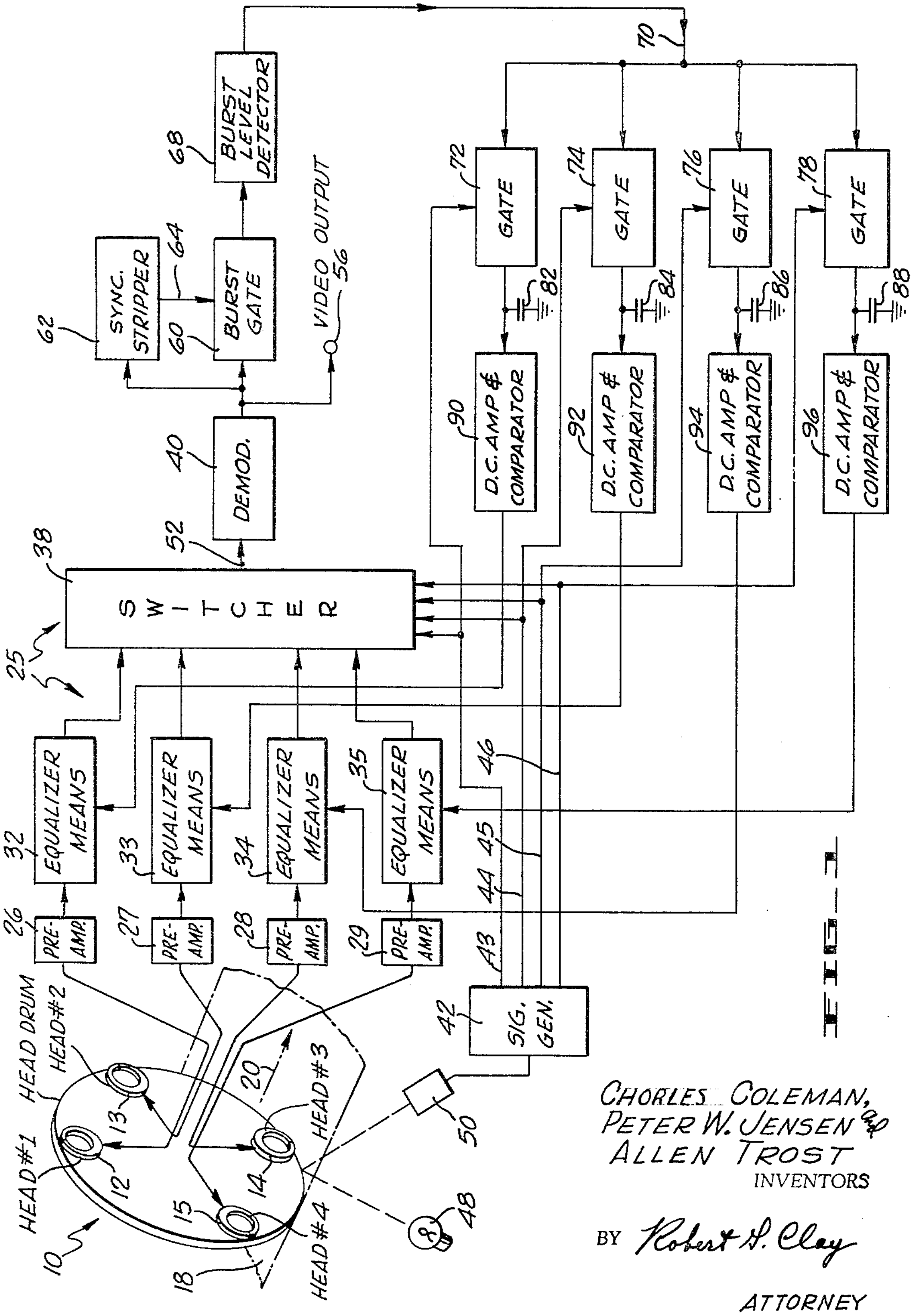
FIGURE 1 is a schematic diagram of the equalizer system.

The construction of a recorder system for recording television signals will be hereinafter specifically considered in detail, but it should be understood that the broad aspects of the invention are equally applicable to any recorder system that requires equalization of its transducers. The construction of recorder systems for recording television signals and in particular color television signals is well known in the prior art and described in such publications as "International Conference on Magnetic Recording," July 6–10, 1964, "The Theory and Design of FM Systems for Use in Color Television Tape Recorders," Felix, Coleman, Jensen, and "Magnetic Recording of Color Television" by Joseph Roizen, Electronics, Jan. 1, 1960 and "Video Tape Recording" by Julian Bernstein, pp. 141–193 (1960). Recorder systems such as these include a servo-driven rotary drum 10 for mounting and rotating a plurality of transducers 12–15. The rotary drum 10 is located adjacent recording medium 18 and in operative relation thereto for the recording of a plurality of tracks transversely across recording medium 18 as it moves in a longitudinal direction as indicated by the arrow 20. The combination of a rotary drum and longitudinally moving medium facilitates a high transducer to medium speed, thereby enabling the recording of input signals of over a megacycle and typically bandwidths in the range of D.C. to 4.2 megacycles.

A rotary transformer or slip ring and brush assembly (not shown) couples transducers 12–15 to reproduce or playback electronics 25. The reproduce electronics 25 comprises a plurality of reproduce preamplifiers 26–29, equalizer means 32–35, switcher means 38 and demodulator 40. A separate preamplifier and equalizer means are coupled to each of the transducers 12–15. The preamplifiers raise the head signal output level by a factor of 50 to a useful level. Such preamplifiers are well known in the art. The equalizer means 32–35 are for compensating for the normal response of the transducers over at least a part of its frequency range. Typical equalizer means 32–35 are shown in pending U.S. patent application Ser. No. 297,425 filed on July 24, 1963 by Charles H. Coleman, Peter W. Jensen and Michael O. Felix and entitled "Playback Equalization Scheme." In this application the equalizer means 32–35 are referred to as first emphasis means. Briefly, the equalizer means described therein comprises a differential amplifier with one input connected to the receiving end of a delay line and the other input connected to the sending end of the delay line via a potentiometer. The voltage at the receiving end of the delay line remains substantially constant with frequency as long as the input voltage is constant. The voltage at the sending end varies cosinusoidally with frequency because of the reflected signal. The phase relationship of these voltages is linear, with the voltages always in phase at the sending end and receiving end. The subtraction of the voltages supplied by the sending and receiving ends of the delay line to the differential amplifier results in the equalizer means providing a high frequency amplitude boost to the signal supplied thereto with a linear phase characteristic over the entire range of frequencies. The maximum boost is obtained at the frequency where the delay line is equal to half a wavelength. This frequency is normally selected to occur at a frequency equal to about twice the carrier frequency. The exact value of this frequency depends upon the shape of the desired equalization curve. It should be understood that this is an example of one equalizer means that may be employed in the invented system, there being many other well known equalizers that can be alternatively employed. It is also within the broad scope of the invention to have the transducers or a pair of transducers share a preamplifier, equalizer, or both.

The switcher means 38 is connected to the outputs of equalizer means 32–35. The switcher means 38 may take the form of an electronic switch including four gates each coupled to one of the transducers 12–15. In addition to these inputs, the gates have control signals supplied by a signal generator means 42 which supplies an output 43–46 to each gate as controlled by the light source 48 and photocell 50 which cooperate with a timing wheel (not shown) associated with rotary drum 10. The outputs from the gates are connected to the switcher means output 52 that is in turn connected to demodulator 40. In operation, photocell 50 supplies an output of 240 cps. to signal generator 42 which in turn supplies two polarities of 480 cps. derived from the 240 cps., two polarities of in phase 240 cps., and two polarities of of quadrature phase 240 cps. These outputs which preferably take the form of square waves will control the gates to sequentially pass the information supplied by transducer 12–15 to the demodulator. The switching from head to head occurs during the blanking interval so that switching transients do not interfere with the picture transmitted. The detailed discussion of such a switcher means along with other switching devices which may be employed in the invented system appears in "Rotary Head Switching in the Ampex Video Tape Recorder" by Ray M. Dolby, Journal of the SMPTE, volume 66, pp. 184–188 (April 1957).

The demodulator 40 converts the signal supplied by output 52 to a form that may be employed in a monitor or other display device. In the case of a recorder for recording color television signals, it is common for the output from switcher 42 to take the form of an FM modulated signal. In such a case, demodulator 40 supplies an output voltage proportional to the frequency of the recorded signal to video output terminal 56.

In addition to the television or other information recorded on tape 18, a correction signal is also recorded thereon having a frequency at which equalizer operation is to be adjusted. This correction signal may take the form of a pilot signal, a pulse type signal or in the case of a color television signal the burst signal on the back porch of the sync pulse may be advantageously employed.

Assuming color television signals are recorded on tape 18, demodulator 40 will provide a composite color television signal to output terminal 56 with the same signal being supplied to burst gate 60 and sync stripper 62. Sync stripper circuits are well known in the art and function to separate the sync pulse from the composite video signal and provide an output properly timed to operate burst gate 60 to pass only the burst signal. This output is provided at sync stripper output 64 which is connected to burst gate 60. The presence of the demodulated composite video signal at the input of burst gate 60 along with the pulse provided by sync stripper 64 opens burst gate 60 to pass the burst signal to burst level detector 68 connected to the output of gate 60. Burst level detector means 68 is a well known circuit which provides a pulse output to output 70 proportional to the frequency of the signal received from gate 60. Typical sync stripper, burst gate and burst detectors or sensor circuits are shown in "Colortec-Direct Color Process," pages 7–10, 13, and 87–91, Instruction Manual P59560, Ampex Corporation (1962).

In a color television recorder system, the burst level detector 68 will provide a pulse for each line of video information. These pulses are supplied by detector 68 to AND gates 72–78. In addition to these pulses, gates 72–78 are connected to signal generator 42. More specifically, the gates 72, 74, 76 and 78 are connected to outputs 43, 44, 45 and 46, respectively, of signal generator 42. The outputs 43–46 sequentially gate the information supplied by transducers 12–15 through switcher means 38 and simultaneously sequentially opens gates 72, 74, 76 and 78, respectively. In this way, the gates 72–78 are opened sequentially and in step with the sequential opening of the gates in the switcher means, thereby sequentially passing burst pulses or equalizer correction signals through each gate 72–78 representative of a particular transducer.

The pulses passed by the gates 72–78 are supplied to charge storage means, such as capacitors 82–88, charging the capacitors to a value proportional to the amplitude of the burst pulses. The capacitors 82–88 are in turn connected to DC amplifier-comparators 90–96. Such a circuit may take the form of a common emitter amplifier with a reference voltage connected to one of its electrodes and the voltage on capacitors 82–88 supplied to another of its electrodes. The reference voltage has a value objectively selected to maximize the fidelity of recorder reproduction. The amplifier-comparators 90, 92, 94 and 96 will supply an output proportional to the difference between the reference voltage and the capacitor voltages to the equalizer means 32, 33, 34 and 35, respectively. The output from the comparators 90–96 are supplied to the equalizer means 32–35.

Where these equalizer means contain a differential amplifier, the output from the comparator merely adjust the amplitude of one of the inputs to the differential amplifier, thus adjusting and correcting equalization. In such an arrangement the usual potentiometer connecting the delay line to the differential amplifier is in essence replaced by an automatic potentiometer. A typical circuit arrangement for accomplishing this automatic operation and interconnecting the comparators and equalizer means is shown in FIGURE 2.

Figure 2:
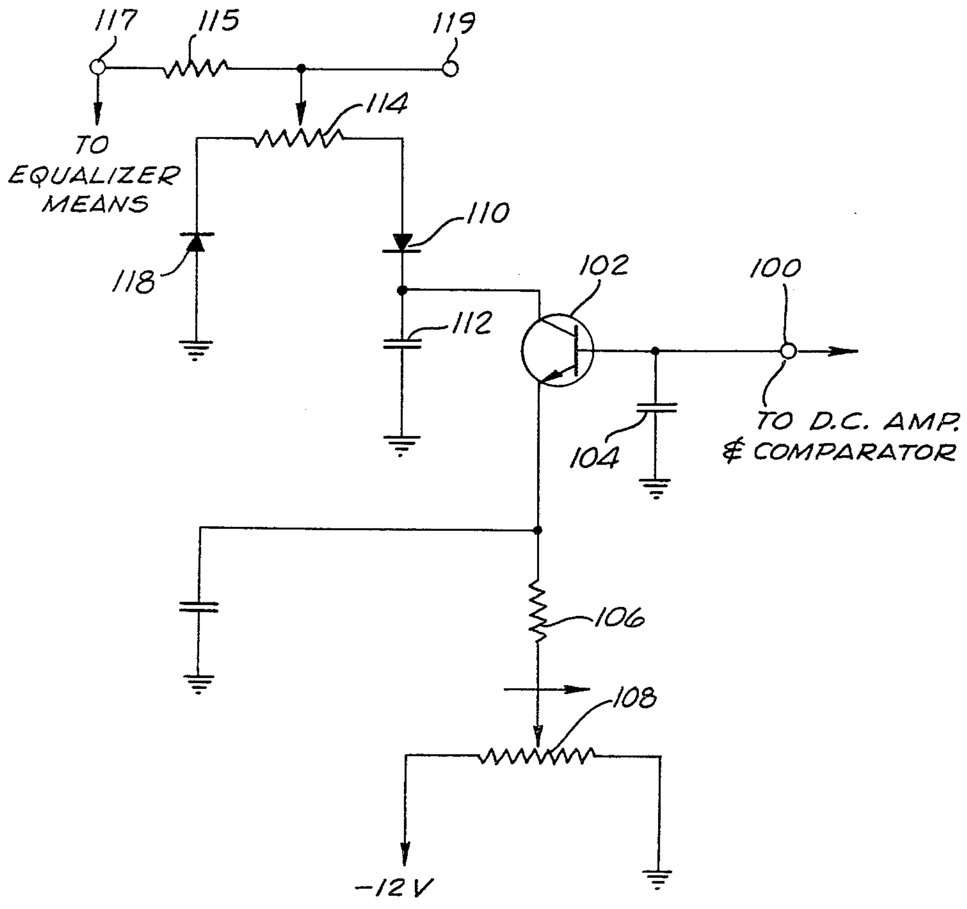
FIGURE 2 is a circuit diagram showing the interconnection between the equalizer means and equalizer correction means.

Referring to FIGURE 2, the output from the DC amplifier comparators 90–96 are each connected to circuits such as the one shown which forms part of the equalizer means 32–35. Only one of these circuits is described in detail but it should be understood that there is one associated with each equalizer means and DC amplifier-comparator. The output from the amplifier-comparators is connected to terminal 100 which in turn is coupled to the base of transistor 102 via an RF short circuit to ground formed by capacitor 104. The transistor 102 acts as a linear amplifier having its emitter set by resistor 106 and potentiometer 108 which is connected to a −12 volt source and to ground. The collector of transistor 102 is connected to diode 110 and capacitor 112 which is connected to ground. Diode 110 is connected to one end of potentiometer 114 which has a potentiometer arm 116 and the other end connected to cathode grounded diode 118. A pair of diodes are employed to minimize distortion while the potentiometer arm 116 is set to balance differences in the diodes 110 and 118. The potentiometer arm 116 is coupled to the sending end of the equalizer means delay line via resistor 115 and terminal 117 is coupled to the differential amplifier of the equalizer means via contact 119. In operation, a change in the signal applied to terminal 100 at the base of transistor 102 results in a change of the biasing voltage applied to diodes 110 and 118 which in turn alters the resistance diodes 110 and 118 placed in circuit voltage intermediate the delay line and differential amplifier. This change in resistance adjusts its operating point of the equalizer means and in particular the high frequency boost provided to the input signal supplied to the equalizer means 32–35.

The overall operation of the system can now be readily understood. Referring to FIGURE 1, the drum 10 rotates over the tape 18 transducing recorded signals therefrom. Typically, at one instant transducer 13 will be in operative relation with the tape 18 and supply a signal to preamplifier 27 which amplifies the supplied signal and supplies an output signal to the equalizer means 33. As the transducer 13 is about to terminate its operative relation with the tape 18 the transducer 12 will come into contact with tape 18 and similarly supply a signal to preamplifier 26 and equalizer means 32. The signals from equalizer means 32 and 33 are supplied to the switcher means 38 which is controlled by signal generator means 42 to combine the signals supplied by the equalizer means 32 and 33 into a continuous television signal supplied to demodulator 50. The signal generator means 42 simultaneous with the controlling of the switcher means to combine the outputs of the equalizer means supplies a controlling signal to gates 72–78 to open the gate corresponding to the head that is supplying information to the demodulator 40. Thus when transducer 12 and equalizer means 32 are supplying signals to demodulator 40, gate 72 is open. Similarly, when transducer 13 and equalizer means 33 are supplying signals to demodulator 40, gate 74 is open. The demodulator in addition to the composite television signal supplied to terminal 56 supplies a correction signal which has been transduced by a particular transducer to the open gate. Thus each gate 72–78 passes a correction signal as played back by a different transducer.

The correction signal is passed to the open gate via burst gate 60 which is opened by a pulse from sync stripper 62 and supplied to detector 68 which converts the transducer correction signal to a pulse having an amplitude proportional to a particular characteristic of the correction signal, such as its amplitude. This pulse is passed through the open gate. Typically, the signal played back by transducer 13 would charge the capacitor 84 while the signal played back by transducer 12 would charge the capacitor 82. The charges on the capacitors alter the signal supplied to the respective equalizer means by DC amplifier-comparators 90–96. In the case of charging capacitors 82 and 84, the outputs from amplifier-comparators 90 and 92 would be altered in accordance with the charge on the capacitors and the value of the reference voltage supplied to the amplifier-comparators. The outputs supplied by the amplifier-comparators in turn alters the setting of the equalizer means so that their equalization is corrected in accordance with the correction signal supplied by each particular transducer.

From the above detailed description it can be seen that an equalizing system has been provided which includes a correction means for separating a correction or burst signal from the other transduced signals, for deriving a signal to correct equalizer operation and for applying this signal to the equalizer means. This automatically and continually equalizes the response of a transducer. When applied to a recorder for recording television signals having a plurality of transducers alternating in cooperative relation with the recording medium, the capability of automatically and continually adjusting the equalizer means enables a picture to be reproduced having uniform characteristics regardless of the transducer which is operative. This capability is especially advantageous in color recorder systems where the effect of transducers operating at different levels and reproducing different color combinations is especially pronounced. In terms of visual effects it can result in the picture reproduced being broken up into different bands of color having various shades. In addition to maintaining uniform response of the various heads the use of a signal recorded on the tape to accomplish this automatic control enables the equalizer means to compensate for portions of the tape originally recorded under different recording conditions. This advantage has particular significance with regards to the dubbing of tapes, such as in the case of commercials added to an already recorded program where the two recordings may take place under different conditions and on different recorders. It is also significant in the recording of color television signals where the slightest variation in recording conditions is reflected in a change of color which the viewer is particular sensitive to. In addition, color television recorders have a well suited correction signal available in the burst signal. The use of a burst signal as a correction signal controls equalization most accurately in the region of 3.58 megacycle subcarrier where a substantial part of the color information is recorded. The exact range of frequencies which the recorded color information occupies is dependent in part upon the carrier employed in an FM recording system. Thus equalization is most accurately controlled in the frequency region where the information most important to color picture presentation is recorded.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. It is the intention, therefore, to be limited only as indicated by the scope of the following claims.

What is claimed is:

1. An equalization system for a recorder employing a recording medium having an equalizer correction signal and information signal recorded thereon, comprising:

a transducer means for transducing said information signal and said correction signal from the recording medium;

equalizer means for compensating for the normal response of said transducer means over at least a part of the frequency range of signals reproduced by said transducer; and equalizer correction means for receiving said correction signal from said transducer and for applying a correction signal to said equalizer means to continually and automatically adjust the compensation of said equalizer means, whereby the operation and efficiency of said transducer is maintained during changing conditions.

2. An equalization system for a recorder employing a recording medium having an equalizer correction signal and information signal recorded thereon, comprising:

a transducer means for transducing said information signal and said correction signal having a substantially constant frequency from the recording medium;

equalizer means for compensating for the normal response of said transducer means over at least a part of the frequency range of signals reproduced by said transducer; and equalizer correction means for receiving said correction signal from said transducer and for applying a correction signal to said equalizer means to continually and automatically adjust the compensation of said equalizer means, whereby the operation and efficiency of said transducer is maintained during changing conditions.

3. In a recorder including a plurality of transducers, the combination comprising:

a recording medium;

an equalizer means associated with each transducer for compensating for the response of said transducer over at least a part of the bandwidth of the recorder;

a correction signal recorded on said medium that when transduced is indicative of equalization effectiveness;

a switcher means coupled to said transducers for combining the outputs of said transducers into a continuous signal;

reproduce electronic means coupled to said switcher means for amplifying the transduced signals; and correction means coupled to said reproduce electronics for receiving said correction signal from said transduced signals, and for continually and automatically adjusting said equalizer means, whereby the output of said transducer is continually and automatically equalized.

4. In a recorder capable of recording frequencies in excess of one megacycle and with a bandwidth that spans a plurality of octaves, the combination comprising:

a plurality of transducers, each of said transducers comprising a channel;

a recording medium;

equalizer means associated with each transducer for compensating for the response of said transducer over at least a portion of the bandwidth of said recorder;

a first signal recorded on said medium that when transduced it is representative of equalizer effectiveness;

switcher means coupled to said transducers for combining the outputs of said transducers into fewer channels;

reproduce electronic means coupled to said switcher means for translating the transduced signals to form a signal substantially identical to the original signal recorded; and correction means coupled to said reproduce electronics for obtaining said first signal from transduced signals, for deriving a correction signal from said first signal related to the effectiveness of said equalizer means and for continually and automatically applying said correction signal to said equalizer means to adjust its compensation, whereby the equalizer means continually and automatically compensates for operating condition of said transducers.

5. In a recorder capable of recording frequencies in excess of one megacycle and with a bandwidth that spans a plurality, the combination comprising:

a plurality of transducers, each of said transducers comprising a channel;

a recording medium;

equalizer means associated with each transducer for compensating for the response of said transducer over at least a portion of the bandwidth of said recorder;

a first signal recorded on said medium that when transduced it is representative of equalizer effectiveness;

second information signals recorded on said medium and transduced along with said first signal;

switcher means coupled to said transducers for combining the outputs of said transducers into fewer channels;

reproduce electronic means coupled to said switcher means for translating the transduced signals to form a signal substantially identical to the original signal recorded; and correction means coupled to said reproduce electronics for separating said first signal from said other transduced signals, for deriving a correction signal from said first signal related to the effectiveness of said equalizer means and for continually and automatically applying said correction signal to said equalizer means to adjust its compensation, whereby the equalizer means continually and automatically compensates for the operating condition of said transducers.

6. In a recorder capable of recording and reproducing color television signals including a burst signal having a frequency of approximately 3.58 megacycles per second, the combination comprising:

a recording medium;

a plurality of rotating magnetic transducers located in operative relationship with respect to said recording medium;

a plurality of equalizer means associated with each of said transducers for compensating in part for the response characteristics of said transducer;

switcher means coupled to said equalizer means for combining the outputs of said transducers into one channel;

demodulating means coupled to said switcher for demodulating the transduced signals;

means for separating the burst signal from said demodulated signal and for providing a burst output signal whose amplitude is related to a characteristic of the recorded burst signal;

a plurality of gate means equal in number to the number of magnetic transducers and coupled to said means for separating for passing the burst output signals therefrom through separate gate means each associated with a particular transducer;

a plurality of comparator-amplifier means each associated with a gate means and transducer for comparing the burst output signal with a reference voltage and for altering the compensation of said equalizer means in accordance with the difference between said reference voltage and said first output signal, whereby the operation of each of said equalizer means are continuously and automatically corrected.

7. In a recorder for recording and reproducing signals that include a reference signal, the combination comprising:

a recording medium;

a plurality of rotating magnetic transducers located in operative relationship with respect to said recording medium;

a plurality of equalizer means associated with each of said transducers for compensating in part for the response characteristics of said transducer;

switcher means coupled to said equalizer means for combining the outputs of said transducers into one channel;

demodulating means coupled to said switcher for demodulating the transduced signals;

means for separating the reference signal from said demodulated signal and for providing a reference output signal whose amplitude is related to a characteristic of the recorded reference signal;

a plurality of gate means equal in number to the number of magnetic transducers and coupled to said means for separating, for passing the reference output signal therefrom through separate gate means each associated with a particular transducer;

comparator-amplifier means each associated with a gate means and transducer for comparing the gated reference output signal with a reference voltage and for altering the compensation of said equalizer means in accordance with the difference between said reference voltage and said reference output signal, whereby the operation of said equalizer means are continuously and automatically corrected.

8. The structure recited in claim 7 wherein a signal generator means is included for operating said switcher means in co-ordination with said gate means.

9. The structure defined in claim 7 wherein said comparator means comprises a capacitor coupled to each of said gate means and a DC amplifier-comparator means coupled to each of said capacitors and to said equalizer means.

10. The structure defined by claim 8 wherein color television signals are recorded and the burst signal is the reference signal, and said means for separating, comprising:

a sync stripper means coupled to said demodulator means for stripping said sync signal from said video signal;

burst gate means coupled to said demodulator and said sync stripper means for passing said burst signal when enabled by said sinc stripper means and said demodulator means; and burst level detector means for generating a pulse having a height related to the amplitude of the incoming burst signal, said burst level detector coupled to all of said gate means.

References Cited

UNITED STATES PATENTS 3,188,615 6/1965 Wilcox ------------- 178—6.6

ROBERT L. GRIFFIN, *Primary Examiner.*

H. W. BRITTON, *Assistant Examiner.*